United States Patent
Gunermann et al.

(10) Patent No.: US 12,266,879 B2
(45) Date of Patent: Apr. 1, 2025

(54) ARRANGEMENT FOR CONNECTING ELECTRICAL CONNECTIONS FOR A DEVICE USED TO DRIVE A COMPRESSOR, AND DEVICE USED TO DRIVE A COMPRESSOR

(71) Applicant: Hanon Systems, Daejeon (KR)

(72) Inventors: Bernd Gunermann, Lennestadt (DE); Eric Rooks, Bonn (DE); Oliver Gormanns, Mönchengladbach (DE); Senol Gecgel, Cologne (DE)

(73) Assignee: HANON SYSTEMS, Daejeon (KR)

( * ) Notice: Subject to any disclaimer, the term of this patent is extended or adjusted under 35 U.S.C. 154(b) by 468 days.

(21) Appl. No.: 17/597,150

(22) PCT Filed: Nov. 6, 2020

(86) PCT No.: PCT/KR2020/015535
§ 371 (c)(1),
(2) Date: Dec. 28, 2021

(87) PCT Pub. No.: WO2021/107442
PCT Pub. Date: Jun. 3, 2021

(65) Prior Publication Data
US 2022/0311164 A1 Sep. 29, 2022

(30) Foreign Application Priority Data

Nov. 25, 2019 (DE) ................. 10 2019 131 791.6

(51) Int. Cl.
*H01R 13/17* (2006.01)
*B60H 1/00* (2006.01)
(Continued)

(52) U.S. Cl.
CPC ......... *H01R 13/17* (2013.01); *B60H 1/00814* (2013.01); *H01R 12/71* (2013.01);
(Continued)

(58) Field of Classification Search
CPC ........ H01R 13/17; H01R 13/10; H01R 13/04; H01R 12/71; H01R 43/0256; B60H 1/00814; H02K 5/225
(Continued)

(56) References Cited

U.S. PATENT DOCUMENTS 5,653,601 A * 8/1997 Martucci .............. H01R 12/716
439/82
6,533,610 B1 * 3/2003 Dai ........................ H01R 24/50
439/581
(Continued)

FOREIGN PATENT DOCUMENTS

| CN | 102437454 A |   | 5/2012 |
| CN | 107017496 A | * | 8/2017 |

(Continued)

*Primary Examiner* — Peter G Leigh
(74) *Attorney, Agent, or Firm* — Shumaker, Loop & Kendrick, LLP; James D. Miller (57) ABSTRACT

An arrangement for connecting electrical connections, in particular through a housing, for a device for driving a compressor with a connection arrangement with at least one electrically conductive connecting element and at least one contact device, fixed in a PCB, for mounting the connecting element in an axial direction. The contact device exhibits at least one spring contact element with elastically de-formable lamellar contact springs that are in electrically conductive contact with the connecting element. Furthermore, the invention relates to a method for mounting the arrangement for connecting electrical connections, a device for driving a compressor of a vaporous fluid, in particular an electric motor, with the arrangement and a use of the device according to the invention.

22 Claims, 4 Drawing Sheets

(51) Int. Cl.
  *H01R 12/71*   (2011.01)
  *H01R 43/02*   (2006.01)
  *H02K 5/22*    (2006.01)
  *H01R 4/02*        (2006.01)
  *H01R 12/58*       (2011.01)
  *H01R 13/04*       (2006.01)
  *H01R 13/10*       (2006.01)

(52) U.S. Cl.
  CPC ......... *H01R 43/0256* (2013.01); *H02K 5/225* (2013.01); *H01R 4/02* (2013.01); *H01R 12/58* (2013.01); *H01R 13/04* (2013.01); *H01R 13/10* (2013.01)

(58) Field of Classification Search
  USPC .......................................................... 439/84
  See application file for complete search history.

(56) References Cited

U.S. PATENT DOCUMENTS

| | | | | |
|---|---|---|---|---|
| 2006/0217005 | A1* | 9/2006 | Langhoff | H01R 13/187 |
| | | | | 439/843 |
| 2009/0151389 | A1* | 6/2009 | Iguchi | F04C 29/047 |
| | | | | 62/505 |
| 2014/0120760 | A1* | 5/2014 | Zieman | H01R 12/91 |
| | | | | 29/874 |
| 2016/0290347 | A1* | 10/2016 | Kinoshita | H01R 13/187 |
| 2018/0087511 | A1* | 3/2018 | Fukaya | F04C 23/008 |
| 2018/0337499 | A1 | 11/2018 | Goebbels et al. | |
| 2019/0305455 | A1* | 10/2019 | Uppleger | H01R 24/86 |

FOREIGN PATENT DOCUMENTS

| | | | | |
|---|---|---|---|---|
| CN | 107154548 | A * | 9/2017 | |
| CN | 208062313 | U * | 11/2018 | |
| CN | 109546404 | A * | 3/2019 | .......... H01R 13/187 |
| CN | 109742578 | A | 5/2019 | |
| CN | 207883954 | U * | 8/2019 | |
| CN | 209692009 | U * | 11/2019 | ............. B60L 53/16 |
| CN | 210779099 | U * | 6/2020 | |
| DE | 102005013989 | A1 | 10/2006 | |
| DE | 202008005394 | U1 | 7/2008 | |
| JP | H0536763 | U | 5/1993 | |
| JP | 07263061 | A | 10/1995 | |
| JP | H07263061 | A | 10/1995 | |
| JP | 08007962 | | 1/1996 | |
| JP | H087962 | A | 1/1996 | |
| JP | 09035785 | A | 2/1997 | |
| JP | H0935785 | A | 2/1997 | |
| JP | 2011198617 | A | 10/2011 | |
| JP | 2017127185 | A | 7/2017 | |
| JP | 2018053828 | A | 4/2018 | |
| JP | 2019009102 | A | 1/2019 | |
| JP | 2019056322 | A | 4/2019 | |
| JP | 2019145504 | A | 8/2019 | |
| JP | 2019533284 | A | 11/2019 | |
| KR | 970008733 | A | 2/1997 | |
| KR | 101865199 | B1 | 6/2018 | |

* cited by examiner

ARRANGEMENT FOR CONNECTING ELECTRICAL CONNECTIONS FOR A DEVICE USED TO DRIVE A COMPRESSOR, AND DEVICE USED TO DRIVE A COMPRESSOR

CROSS-REFERENCE TO RELATED PATENT APPLICATIONS

This patent application is a United States nation phase patent application based on PCT/KR2020/015535 filed on Nov. 6, 2020, which claims the benefit of German Patent Application No. 10 2019 131 791.6 filed on Nov. 25, 2019, the entire disclosures of which are hereby incorporated herein by reference.

TECHNICAL FIELD

The invention relates to an arrangement for connecting electrical connections for a device used to drive a compressor. The invention also relates to a method for mounting the arrangement, and a device used to drive a compressor, in particular an electric motor to compress a vaporous fluid, in particular a refrigerant. The compressor can be used in a refrigerant circuit of a motor vehicle air-conditioning system.

BACKGROUND ART

Compressors for mobile applications known from prior art, in particular for motor vehicle air-conditioning systems, and used to convey refrigerant through a refrigerant circuit, which are also called refrigerant compressors, are often produced as piston compressors with variable displacement or as scroll compressors. The compressors are driven either via a pulley or electrically.

An electrically driven compressor exhibits, in addition to the electric motor for driving the appropriate compressing mechanism, an inverter for driving the electric motor. The inverter is used to convert the direct current from a power vehicle battery into alternating current supplied to the electric motor via electrical connections.

The inverter exhibits plug connections for the plug-in connectors produced as pins for electrical connection with connections of the electric motor and thus for transfer of electrical power from the inverter to the electric motor. The connections of the inverter can be arranged on a PCB.

Conventionally, glass-metal glands are used to lead the plug-in connectors through the housings. When producing the glass-metal glands, the tolerances of all components to be connected are added. The large deviations in alignment of the plug-in connectors for electrical connection with the connections of the electric motor and the inverter are to be compensated by way of both high flexibility and high accuracy.

Since the currently available connection components do not compensate the occurring tolerances sufficiently and due to the critical mechanical tensions resulting during the PCB assembly, in particular when connecting the plug-in connectors to the PCB, the plug-in connectors cannot be connected directly to the PCB of the inverter. Consequently, the plug-in connectors must be connected to the PCB indirectly, e.g. by way of busbars, soldered punched and bent parts, solid or flexible press-fit elements or clamps, screw-fitted round eyelets, plug-fit systems or stranded wires.

Contact elements known from prior art and used for direct connection of the plug-in connectors to the PCB require the formation of highly precise pass-through openings for press-fitting or are to be soldered selectively which, as an additional process step, is both costly and very time-consuming.

WO 2015 146677 A1 describes an electrically driven compressor with a compression arrangement, an electric motor for driving the compression arrangement and an inverter for supplying the electric motor with current. The electric motor exhibits a rotor and a stator with an electrically isolating bobbin arranged on the end of a stator core, coils arranged on the bobbin, and a connector housing with connections for electrical connection of the coils to the inverter by way of pins produced as plug-in connectors. The ends of the plug-in connectors aligned towards the inverter are connected to the latter via a jack connection.

Consequently, very complex systems with a large number of components and electrical transition points are known from prior art. Furthermore, there is the risk of elements, such as screws or bolts, detaching from the system. The known pressing technology—selective soldering and also screw connection, require additional, time consuming process steps in mounting and production. Furthermore, the geometrical or also the thermal compensation of the tolerances during mounting or operation are often not guaranteed.

SUMMARY

The task of the invention is to provide an arrangement for reliable and secure electrical connection of connections for a device for driving an electrically driven compressor of a vaporous fluid, in particular an electric motor, which can be manufactured in an easy and time-saving manner. The arrangement is to comprise as few individual components as possible and is to be easy to construct, also with a view to minimizing the manufacturing costs. In particular, the complexity of the design of the arrangement and thus of the device is to be minimized and inaccuracies are to be eliminated. Furthermore, the arrangement is to be produced such that reliable and optimum electrical connections for the system are guaranteed.

The task of the invention is solved by way of the objects with the features of independent patent claims. Further embodiments are specified in the dependent patent claims.

The task is solved by way of an arrangement according to the invention for connecting electrical connections, in particular through a housing or through a wall of the housing, for a device used to drive a compressor. The arrangement is produced as a connection arrangement with at least one electrically conductive connecting element and at least one contact device fixed in a PCB and intended to mount the connecting element in axial direction.

In accordance with the conception of the invention, the contact device exhibits at least one spring contact element with elastically deformable lamellar contact springs that are in electrically conductive contact with the connecting element, preferably fully enclosing it. Thus, electrical contact is established between the contact device that is electrically connected with the PCB and the connecting element.

The connecting element serves preferably for connection of an electrical connection to be installed within a support element arranged on a stator of the device used to drive a compressor to an electrical connection arranged outside the housing, in particular of an inverter. The support element can be produced with a mounting element that is produced preferably with electrical connections of the stator for mounting a connector housing. The connecting element can be inserted into the connector housing and an electrical connection arranged therein.

Both the contact device and the connecting element are made preferably of an electrically conductive material, in particular a metal.

In further embodiments of the invention, the contact device exhibits at least one component that is produced as a hollow cylinder-shaped contact sleeve. A form that can be closed at least on the end face of the cylinder is also to be understood as a hollow-cylinder shape.

A component of the contact device which exhibits the form of a hollow cylinder-shaped contact sleeve is produced preferably with a first segment and a second segment, both of which extend in the axial direction and are connected to one another at a collar. The first segment extends preferably from a first end face up to the collar and the second segment from a second end face up to the collar. The collar is produced such that it projects beyond the outer surfaces of the segments preferably in the radial direction and fully encloses the component. The diameters of the outer surfaces of the segments are preferably constant.

The collar is aligned preferably on a plane that extends vertically relative to the longitudinal axis of the component that is arranged in the axial direction.

According to a preferred embodiment of the invention, one segment of the component of the contact device, which exhibits the form of a hollow cylinder-shaped contact sleeve, is inserted, in particular pressed, into a pass-through opening produced in the PCB up to the collar and then soldered to the PCB.

Another advantage of the invention is that the lamellar contact springs of the spring element are produced as strip shapes in the axial direction of the contact device. The lamellar contact springs are connected to one another preferably at ends arranged opposite one another. The connections of the lamellar contact springs in the area of the ends and the end faces of the hollow-cylinder shaped component are each produced in the form of a circular ring.

In an initial state of the component, the lamellar contact springs are produced with outward or inward bulging in a radial direction in the area between the ends, in particular evenly over the length. Initial state is to be understood as the state when the arrangement or device is not fitted.

In an advantageous embodiment of the invention, the connecting element is produced as a pin-like plug-in connector with a cylinder shape and exhibits preferably the shape of a straight pin. The connecting element can exhibit a circular cylinder shape with an essentially constant outer diameter at least in the area of connection with the contact device.

The contact device and the connecting element are aligned preferably coaxially to one another.

According to a first alternative embodiment of the invention, the contact device exhibits a first contact element, as well as a second contact element that is produced separately to the first contact element. It is advantageous that the first contact element produced as a hollow cylinder-shaped contact sleeve, in particular with a closed end face, is arranged in the radial direction on an outer surface of the second contact element in such a way that the second contact element is fully enclosed, resulting in the second contact element being located completely inside the first contact element and the contact elements being arranged and aligned coaxially to one another.

The first contact element produced as a hollow cylinder-shaped contact sleeve exhibits an opening with an internal diameter, which is preferably constant over its length, which extends from a first end face to a second, end face, in particular produced as a closed end face for mounting the second contact element.

The second contact element is produced preferably as a spring contact element with elastically deformable lamellar contact springs and arranged such that it encloses the connecting element, preferably fully, and establishes electrical contact. The second contact element exhibits an internal diameter in the area of each end face which is essentially a little smaller than the outer diameter of the plug-in connector so that, when the arrangement is fitted, an inner surface of each of the lamellar contact springs is in spring contact with an outer surface of the plug-in connector. The lamellar contact springs are connected to one another at ends arranged opposite one another, wherein the connections are each produced preferably in the form of a circular ring. The circular ring is produced preferably with a slot-shaped opening that extends, in particular in the axial direction so that the diameter of the circular ring is variable.

In addition, it is a special advantage that the lamellar contact springs in an initial state of the second contact element or when the arrangement is not fitted are produced with outward bulging in a radial direction, wherein the second contact element exhibits a maximum outer diameter in the section produced with the lamellar contact springs. The maximum outer diameter in the section produced with the lamellar contact springs is greater than an internal diameter of the first contact element produced as a circular hollow cylinder-shaped contact sleeve and that, when the arrangement is fitted, the lamellar contact springs are each elastically deformed and in contact via their outer surface with an inner surface of the first contact element.

The second contact element is produced with a locking mechanism that faces radially preferably inwards on an end face of a circular ring that faces outwards in the axial direction. The locking mechanism serves as a stop when arranging the second contact element on the plugin connector.

According to a further embodiment of the invention, the first contact element of the contact device, produced as a hollow cylinder-shaped contact sleeve, exhibits a first section and a second section, each of which extends in the axial direction and which are connected to one another at the collar. The first section extends from a first end face up to the collar and is produced in particular with a greater extent in the axial direction than the second section that extends from a second end face up to the collar.

The first section, preferably up to the collar, of the first contact element is preferably inserted, in particular pressed, into a pass-through opening that is produced in the PCB and is then soldered to the PCB.

According to a second alternative embodiment of the invention, the contact device is produced as a one-piece component with a first contact area and a second contact area. The contact areas, produced as circular hollow cylinder-shaped sleeves, exhibit an opening, specifically a pass-through opening, that extends from a first end face to a second end face of the contact device and is intended for mounting the connecting element.

The second contact area is produced preferably as a spring contact element with elastically deformable lamellar contact springs and arranged such that it, preferably fully, encloses the connecting element and establishes electrical contact. In an initial state of the contact device, the lamellar contact springs are produced with an inward bulge in a radial direction, wherein the contact device exhibits a minimum internal diameter in the second contact area, produced with the lamellar contact springs. The minimum internal diameter is smaller than an outer diameter of the connecting element and that, when the arrangement is fitted, an inner surface of each of the lamellar contact springs is in contact with an outer surface of the connecting element.

According to a further embodiment of the invention, the contact areas, produced as circular hollow cylinder-shaped sleeves, each extend in the axial direction and are connected to one another at a collar. The first contact area extends from a first end face up to the collar and is produced in particular with a lesser extent in the axial direction than the second contact area that extends from a second end face up to the collar.

The first contact area of the contact device, in particular up to the collar, is preferably inserted, specifically pressed into a pass-through opening that is produced in the PCB and is then soldered to the PCB.

According to a further preferred embodiment of the invention, the connection arrangement is produced with at least one electrically conductive connecting element and one mounting element, wherein the connecting element that is fully enclosed by the mounting element is arranged and connected firmly and fluid-tightly with the retaining element by way of a structural element such that the connecting element each projects beyond the retaining element with a first area and a second area. The first area of the connecting element can be arranged in such a way that it is connected to the device used to drive a compressor.

The mounting element is produced preferably in plate-like form with surfaces arranged opposite one another and at least one pass-through opening for mounting of the at least one connecting element, wherein the first area and the second area of the connecting element project beyond the surfaces of the mounting element, which are arranged opposite one another, and a third area of the connecting element is arranged inside the pass-through opening. The areas of the connecting element are aligned along a common axis, in particular a longitudinal axis.

A further advantage of the invention is that a slot produced between the connecting element, in particular the third area of the connecting element, and the mounting element, specifically between the connecting element and a wall of the mounting element which surrounds the pass-through opening, is filled by the structural element. The structural element is produced preferably as a glass structural element.

The task of the invention is also solved by way of a device according to the invention, used to drive a compressor of a vaporous fluid, in particular an electric motor. The device exhibits a rotor and a fixed stator, extending along a common longitudinal axis, and a housing.

The stator is positioned preferably in the radial direction on an outer surface of the rotor, enclosing the rotor.

According to the conception of the invention, a support element with a mounting element for mounting of at least one connecting element and an arrangement for connecting electrical connections are produced on a first end face of the stator, aligned in an axial direction.

The term 'axial direction' in this context is to be understood as the direction of the longitudinal axis of the stator, which also corresponds to the longitudinal axis and rotational axis of the rotor. An end face aligned in the axial direction is arranged on a plane that extends vertically relative to the longitudinal axis.

The task of the invention is also solved by way of a method according to the invention for mounting the arrangement for connecting electrical connections for a device used to drive a compressor. The method exhibits the following steps:

Connection of at least one contact device to a PCB, wherein the contact device, always leading with its first end face, is inserted through a pass-through opening in the PCB until the contact device is in contact with a collar on the PCB, as well as Soldering of the contact device to the PCB, and Attachment of a spring contact element with elastically deformable lamellar contact springs of the contact device to a connecting element so that the contact device with the spring contact element is in electrically conductive contact with the connecting element and an electrical connection is established between the PCB and the connecting element.

According to a first alternative embodiment of the invention, at least one first contact element of the contact device is connected to the PCB and at least one second contact element is attached to a connecting element. Furthermore, the PCB with the at least one first contact element, itself firmly connected to the PCB, is pressed onto the plug-in connector with the at least one second contact element, itself attached on the plug-in connector, in such a way that the second contact element with the plug-in connector is arranged inside the first contact element.

When inserting the second contact element into an opening of the first contact element, individual lamellar contact springs of the spring contact element are brought into contact with an inner surface of the first contact element and elastically deformed in such a way that an electrical connection is established between the contact elements of the contact device.

According to a second alternative embodiment of the invention, the at least one contact device is connected to the PCB in a first contact area. In addition, the PCB with the contact device, itself firmly connected to the PCB, is pressed onto the plug-in connector with a second contact area in such a way that the plug-in connector is arranged at least inside the second contact area of the contact device.

When pressing the contact device with the second contact area onto the plug-in connectors, preferably individual lamellar contact springs of the spring contact element are brought into contact with outer surfaces of the plug-in connectors and elastically deformed in such a way that an electrical connection is established between the contact device and the plug-in connector.

The advantageous embodiment of the invention allows the use of the device used to drive a compressor, in particular of an electric motor, for compressing a vaporous fluid for a compressor of a refrigerant in a refrigerant circuit of a motor vehicle air-conditioning system.

In summary, it can be stated that the arrangement according to the invention for connecting electrical connections or the device according to the invention used for driving a compressor of a vaporous fluid with the arrangement exhibits further various advantages:

Minimum number of components with low requirements in respect of the accuracies and tolerances for mechanical and thermal forces, such as those of the connecting elements inside the structural element, as it is guaranteed that large tolerances are compensated, thus also Low space requirements and large available construction space at the inverter;

Straightforward installation of the arrangement with direct electrical contact of the connecting element to the PCB, in particular without the use of busbars in connection with selective or manual soldering, e.g. because automatic PCB assembly together with other electronic components is possible with minimum engaging force, wherein the contact devices exhibit an axial locking mechanism that also serves as an axial soldering area and the pre-tinned contact device can be soldered directly to the PCB, the pressing in or screwing in or selective soldering of individual contact elements on the PCB are not necessary, and wave soldering using the reflow method is possible;

With a minimal number of electrical contact points arranged in series, merely minimal electrical losses occur with at the same time maximal heat dissipation, in particular through the heat-conducting plug-in connectors, and Minimum manufacturing costs.

BRIEF DESCRIPTION OF DRAWINGS

Further details, features and advantages of embodiments of the invention result from the following description of examples of embodiment with reference to the corresponding drawings. The illustrations show the following.

DETAILED DESCRIPTION OF AN EMBODIMENT

Figure 1A:
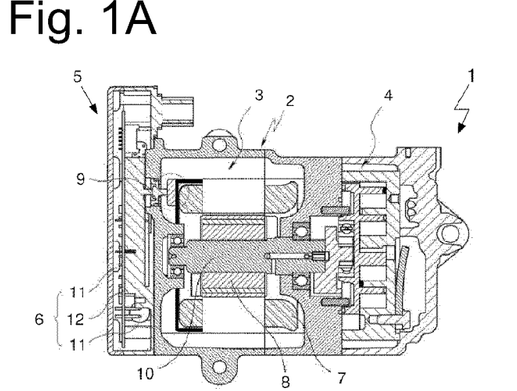
FIG. 1A: An electrically driven compressor with a device, in particular an electric motor, for driving a compressing mechanism and an arrangement of an inverter in a cross-sectional view.

FIG. 1A shows an electrically driven compressor 1 of a vaporous fluid, specifically for a motor vehicle air-conditioning system for conveying refrigerant through a refrigerant circuit, with an electric motor 3 arranged in a housing 2, as a device 3 for driving a compressing mechanism 4, and an arrangement of an inverter 5 in a cross-sectional view. The electric motor 3 is supplied with electrical energy via a switching device 6 of the inverter 5.

The electric motor 3 exhibits a stator 7 with an essentially hollow-cylinder shaped stator core and coils wound on the stator core and a rotor 8 arranged inside the stator 7. The rotor 8 is set in rotary motion when electrical energy is supplied to the coils of the stator 7 via a connection arrangement. The connection arrangement 9 is produced at an end face of the stator 7 and exhibits numerous electrical connections.

The rotor 8 is arranged coaxially inside the stator 7 and such that it can be rotated around a rotational axis. A drive shaft 10 can be produced either integrally with the rotor 8 or as a separate element.

The electric motor 3 and the compressing mechanism produced as a scroll compressor with a fixed and an orbiting spiral 4 are arranged within a volume enclosed by the housing 2, wherein the housing 2 is produced of a first housing element for mounting the electric motor 3, and a second housing element for mounting the compressing mechanism 4, and preferably a metal, in particular aluminum.

The orbiting spiral of the compressing mechanism 4 in which the vaporous fluid, specifically a refrigerant, is compressed is driven by way of the drive shaft 10 connected to the rotor 8 of the electric motor 3. According to an embodiment not represented here, the compressing mechanism can also be produced with a wobble plate, for example.

The switching device 6 for controlling the operation of the electric motor 3 exhibits a PCB 12 produced with different switching elements 11. Different control circuits and components are mounted and electrically connected on the PCB 12 and supplied with electrical energy from an external power source.

A support element with a mounting element with connection passages for a connector housing with connection terminals is arranged on the end face of the stator 7. The connection terminals of the connector housing serve as components of an electrical connection between the coils of the electric motor and the inverter, in particular electrically conductive, pin-like connecting elements that are inserted through the connection passages of the mounting element of the support element and plugged into the connection terminals of the connector housing.

Figure 1B:
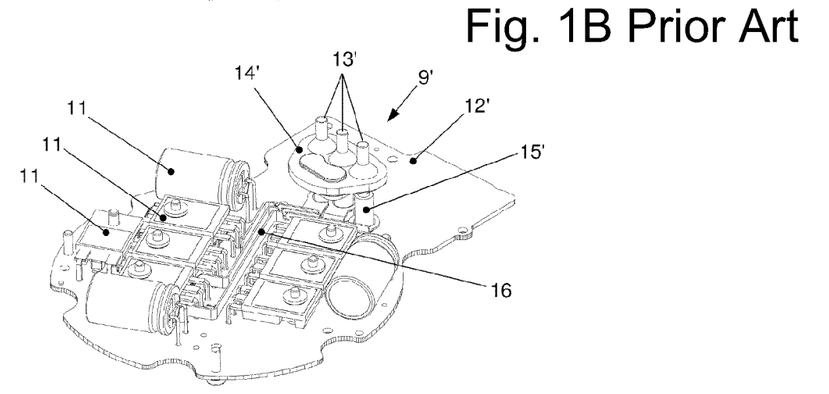
FIG. 1B: A PCB of the inverter with switching elements and a connection arrangement from prior art in a perspective view.
Figure 1C:
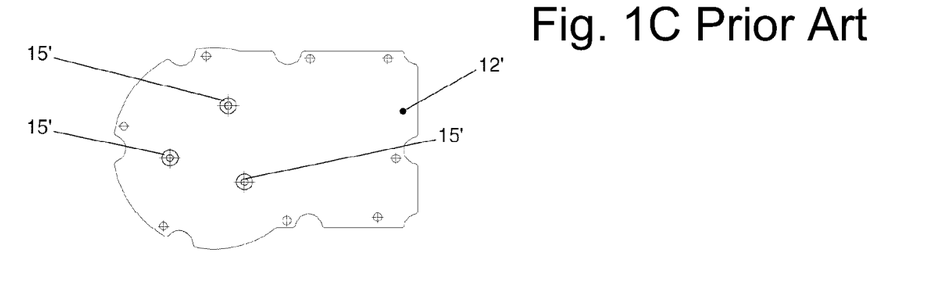
FIG. 1C: The PCB from FIG. 1B with pressed-in contact sleeves in a top view.

FIG. 1B shows a PCB 12' of the inverter with switching elements 11 and a connection arrangement 9' with contact sleeves 15' from prior art in a perspective view which are pressed into the PCB 12'. FIG. 1C shows the PCB 12' from FIG. 1B with the contact sleeves 15' pressed into the PCB 12' in a top view.

The electrically conductive, pin-like connecting elements 13' of the connection arrangement 9', which represent the connections to the electrical connections of the electric motor not shown here, are connected to the inverter by way of the contact sleeves 15' pressed into the PCB 12'. The connecting elements 13', also called plug-in connectors, are fixed inside a mounting element 14' parallel to each other. The contact sleeves 15' are also parallel to each other and arranged at the same clearance as the plug-in connectors 13' of the connection arrangement 9' for mounting the plug-in connectors 13'. The contact sleeves 15' are pressed directly into the PCB 12'.

For electrical connection of the individual components to one another, the busbars 16 are soldered selectively on the PCB 12'. For example, each contact sleeve 15' on an end of a busbar 16 is connected both electrically and mechanically to the busbar 16.

When the arrangement is fitted, the plug-in connectors 13' are each inserted into a contact sleeve 15'. Plug-in connector 13' and contact sleeve 15' are produced in such a way that each plug-in connector 13' is in contact with an outer surface with an inner surface of a hollow cylinder-shaped contact sleeve 15' in such a way that an electrical contact is established.

The objective of the indirect contacting produced by way of the busbars 16 is to compensate the tolerances occurring when arranging the individual components of the electrical connections. In addition, this indirect contacting can only be realized in combination with relatively long and flexible busbars 16.

Figure 2A:
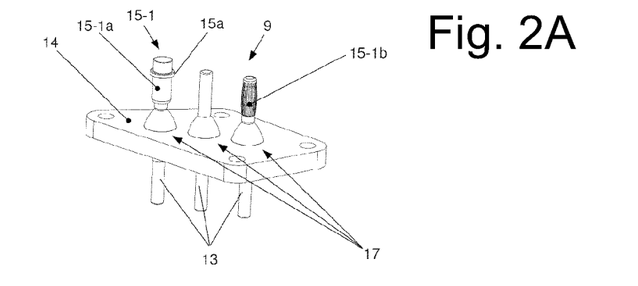
FIG. 2A: A connection arrangement with connecting elements, a mounting element and a first contact device with a first and a second contact element for connecting the electrical connections of the electric motor electrically with the electrical connections of the inverter in a perspective view.

FIG. 2A shows a connection arrangement 9, in particular a glass-metal gland, with connecting elements 13, a mounting element 14, as well as structural elements 17 and a first contact device 15-1 with a first contact element 15-1*a* and a second contact element 15-1*b* for connecting the connections arranged in the connector housing of the electric motor electrically with the connections of the inverter in a perspective view.

The connecting elements 13 are inserted through the plate-like mounting element 14. Each connecting element 13 exhibiting the form of a straight pin, which hereinafter is also called plug-in connector 13, is arranged such that three different areas are formed which are aligned along a common axis, in particular a longitudinal axis. A first area and a second area each project beyond the surfaces of the plate-like mounting element 14 which are arranged opposite one another. A third area of the plug-in connector 13 is in each case arranged inside the mounting element 14.

The plug-connectors 13 produced preferably as straight circular cylinders with constant diameter over the full length are each arranged with the third area within a pass-through opening intended inside the mounting element 14. The internal diameter of the pass-through opening corresponds to the outer diameter of the plug-in connector 13 plus a clearance for mounting and fixing the plug-in connector 13 inside the pass-through opening. The slot produced between the plug-in connector 13 and the wall surrounding the mounting element 14 is filled by the structural element 17, in particular a glass structural element. The structural element 17 filling the slot and produced preferably of glass serves, on the one hand, for fixing the plug-in connector 13 inside the pass-through opening and thus on the mounting element 14, as well on the other hand, for isolating the electrically conductive plug-in connector 13 from the mounting element 14, wherein the structural element 17 projects beyond the plane of the corresponding surface of the mounting element 14 in the direction of the plug-in connector 13. The projections of the structural element 17 each exhibit essentially the form of a cone or truncated cone.

Being difficult to set and reproduce, the arrangement of the plug-in connectors 13 inside the mounting element 14 is subject to manufacturing tolerances, in particular since the tolerances of all tools are added in manufacturing. The deviations are to be compensated both with high flexibility and also high accuracy.

For safe electrical connection with compensation of the occurring tolerances, a first embodiment of a contact device 15-1 exhibits two contact elements 15-1*a*, 15-1B that are arranged coaxially to one another and, when the contact device 15-1 is fitted, extend along a common longitudinal axis. The first contact element 15-1*a* produced essentially as a hollow cylinder-shaped contact sleeve with a closed end face is in the radial direction positioned on an outer surface of the second contact element 15-1*b* in such a way that it fully encloses the second contact element 15-1*b*, wherein the second contact element 15-1*b* is produced as a spring contact element, in particular with elastically deformable lamellar contact springs.

FIG. 2A shows both a second contact element 15-1*b* of a contact device 15-1, which is pressed onto an area of the plug-connector 13, which projects beyond the mounting element 14, and a first contact element 15-1*a* of a contact device 15-1, which cannot be seen here. The second contact element 15-1*b* is arranged completely inside the first contact element 15-1*a* and thus hidden by the first contact element 15-1*a*.

The first contact element 15-1*a* exhibits essentially the form of a circular hollow cylinder-shaped sleeve with a closed end face with a first section and a second section, which each extend in the axial direction of the sleeve and are connected to one another by way of a section produced as a collar 15*a*, specifically as a seat or flange. The collar 15*a* is produced around the whole outer surface of the sleeve.

Consequently, the first section extends from a first end face of the sleeve up to the collar 15*a* and is produced with a greater extent in the axial direction than the second section that extends from a second, closed end face of the sleeve up to the collar 15*a*.

In addition, the sleeve exhibits an opening for mounting the second contact element 15-1*b*, which exhibits an internal diameter that is preferably constant over the length, is produced in particular as a blind hole and extends from the first end face to the second, closed end face of the sleeve. The closed end face of the first contact element 15-1*a* serves as a stop for the second contact element 15-1*b* when mounting the contact device 15-1 and for fixing the second contact element 15-1*b* between the plug-in connector 13 and the first contact element 15-1*a*, wherein the closed end face of the first contact element 15-1*a* prevents undesired displacement of the second contact element 15-1*b* along the plug-in connector 13 during mounting.

The hollow cylinder-shaped first contact element 15-1*a* is both in the first section and also in the second section produced with an essentially constant wall thickness. The collar 15*a* is aligned on a plane that extends vertically relative to the longitudinal axis of the first contact element 15-1*a* and projects beyond outer surfaces of the segments in the radial direction in such a way that the first contact element 15-1*a* in the area of the collar 15*a* is produced with a larger wall thickness.

The extension of the first contact element 15-1*a* in the axial direction of the opening of the first contact element 15-1*a*, which is specifically produced as a blind hole, corresponds preferably essentially to the maximum length of the area of the plug-in connector 13, which projects beyond the mounting element 14 or structural element 17.

Figure 2B:
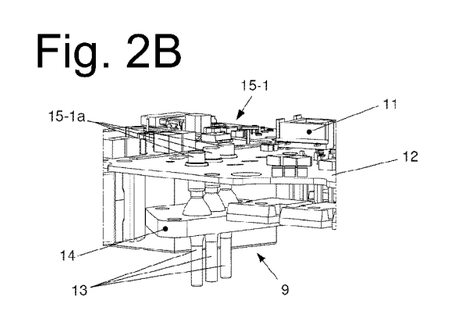
FIGS. 2B to 2D: The connection arrangement with the first contact device from FIG. 2A in a state when the inverter is fitted on the PCB, in a lateral representation, cross-sectional view and perspective view of the PCB.
Figure 2C:
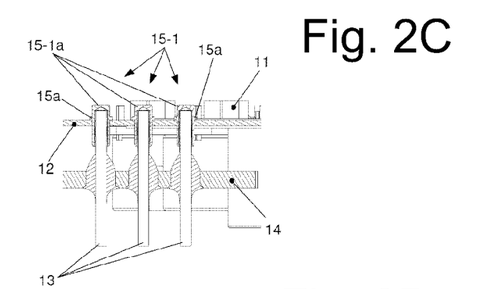
Figure 2D:
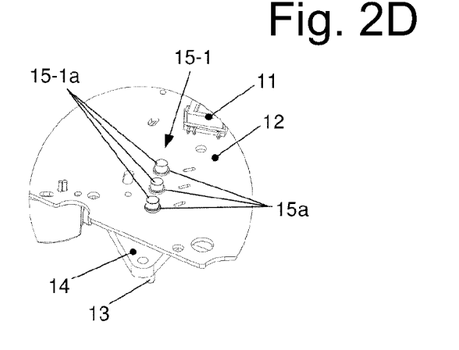
Figure 2E:
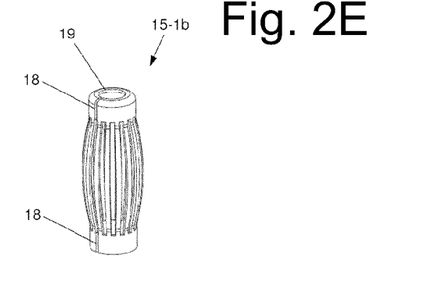
FIGS. 2E to 2H: A second contact element each of the first contact device from FIGS. 2A to 2D in a perspective overall view and a detail view.
Figure 2F:
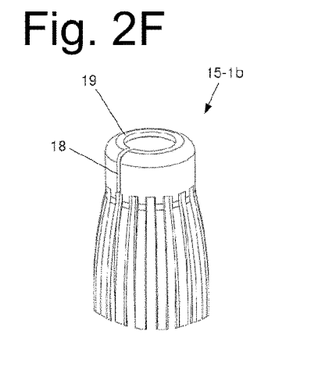
Figure 2G:
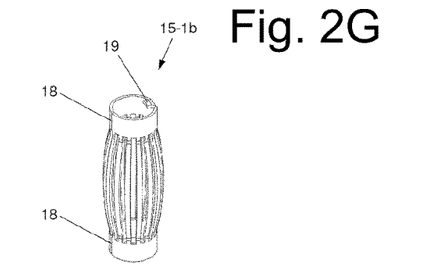
Figure 2H:
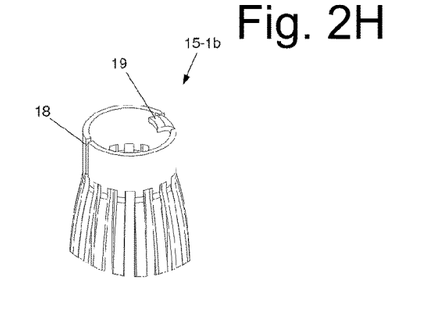

FIGS. 2B to 2D show the connection arrangement 9 with the contact device 15-1 from FIG. 2A in a state when the inverter is mounted on the PCB 12 in a lateral view, cross-sectional view and perspective view of the PCB 12.

The first contact element 15-1*a* is arranged directly in the PCB 12 and soldered to the PCB 12, wherein the contact sleeve, always leading with its first end face, is inserted through a pass-through opening in the PCB until the flange-like or bulge-like collar 15*a* is in contact with a surface of the PCB 12. Consequently, the collar 15*a* serves as an axial stop and support when mounting. On the one hand, the first contact element 15-1*a* projects with its first section and the collar 15*a* on a first surface of the PCB 12 beyond the PCB 12. On the other hand, the first contact element 15-1*a* projects with one part of the first section of a second surface of the PCB 12 beyond the PCB 12.

The diameter of the pass-through opening to be produced in the PCB 12 corresponds essentially to the outer diameter of the first section of the first contact element 15-1*a* plus a clearance for mounting and soldering the components. For reflow soldering, for example, the surface of the first contact element 15-1*a*, which is produced of a metal, is treated, in particular coated, especially tinned.

The form and design of the first contact element 15-1*a* is suited for automatic completion of the PCB 12. After automatic placement of the first contact element 15-1*a* in the pass-through opening of the PCB 12, the first contact element 15-1*a* is connected to the PCB 12 by way of soft-soldering. In addition, the collar 15*a* produced as an axial stop provides for a sufficient soldering slot during the soldering process so as to take up all loads during mounting and operation.

During the mounting process, a second contact element 15-1*b* produced also as a sleeve-like spring contact element, in particular with elastically deformable lamellar contact springs, is attached onto one of the plug-in connectors 13 of the connection arrangement 9, which are coupled by way of the mounting element 14. The wall of the second contact element 15-1*b* is produced in the form of a circular ring in the area of the end faces and bulging evenly outwards in a radial direction in the area of the lamellar contact springs. The lamellar contact springs produced as strip shapes are connected to one another on the end faces. FIGS. 2E-2H show a second contact element 15-1*b* of the first contact device 15-1 in an exploded view and a perspective overall view, as well as in a detail view.

The second contact element 15-1*b* exhibits an internal diameter in the area of each end face, which is a little smaller than the outer diameter of the plug-in connector 13 and that, when the arrangement is fitted, an inner surface of each of the lamellar contact springs is in contact with an outer surface of the plug-in connector 13 in such a way that an electrical contact is established to the plug-in connector 13. To be able to apply the spring force when mounting and when the arrangement is fitted, the circular ring is produced with a preferably slot-like opening 18 in the area of the end faces of the wall of the second contact element 15-1*b*, and fully slotted in particular in the axial direction. The opening 18 allows an at least slight enlargement of the diameter of the circular ring so as to be able to produce the required spring force.

The second contact element 15-1*b* exhibits a maximum outer diameter in the area produced by the lamellar contact springs, which is greater than the internal diameter of the first contact element 15-1*a*. When inserting the second contact element 15-1*b* into the opening of the first contact element 15-1*a*, the individual lamellar contacts are brought into contact with the inner surface of the first contact element 15-1*a* and elastically deformed in such a way that an electrical connection is established between the contact elements 15-1*a*, 15-1*b* of the contact device 15-1.

Depending on the mounting order, the second contact element 15-1*b* is, due to the elastic deformation, fixed such that it cannot be lost either in the area of the end faces on the plug-in connector 13 or in the area of the lamellar contact springs inside the first contact element 15-1*a*.

When the arrangement is fitted, the PCB 12 with the first contact elements 15-1*a* firmly connected to the PCB 12 is attached onto the plug-in connectors 13 of the connection arrangement 9 with the second contact elements 15-1*b* plugged onto the plug-in connectors 13 in such a way that the second contact elements 15-1*b* with the plug-in connectors 13 are arranged inside the first contact elements 15-1*a*.

In the state when the arrangement is fitted, the second contact elements 15-1*b* are fixed each inside a clearance produced as a slot, in particular essentially as a circular slot, between one outer surface of the plug-in connector 13 and an inner surface of the first contact element 15-1*a*.

The second contact element 15-1*b* is produced on one of the circular end faces on a side that faces outwards in the axial direction with a locking mechanism 19 that faces radially inwards and serves as a stop when mounting on the plug-in connector 13 and fixes the second contact element 15-1*b* between the first contact element 15-1*a* and the plug-in connector 13. The locking mechanism 19 ensures that the second contact element 15-1*b* is plugged onto the plug-in connector 13 merely up to a certain position and is locked in position. The locking mechanism 19 can be produced e.g. as a fully enclosing collar according to FIGS. 2E to 2F, which faces radially inwards, or according to FIGS. 2G and 2H, as a single element in the form of a hook or finger. In addition, an embodiment of the locking mechanism with at least two single elements, preferably arranged opposite one another, is conceivable.

When mounted, the first contact element 15-1*a*, the second contact element 15-1*b* and the plug-in connector 13 are aligned and arranged in such a way that the occurring tolerances are compensated sufficiently so as to be able to mount the plug-in connectors 13 also under extreme tolerance conditions and establish an electrical connection between the PCB 12 and the plug-in connector 13.

Figure 3A:
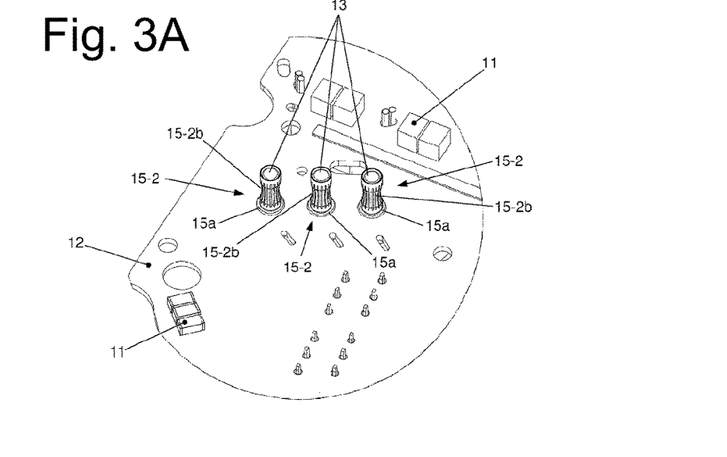
FIGS. 3A and 3B: Connecting elements of the connection arrangement, each with a second contact device in a state when the inverter is fitted on the PCB, in perspective and cross-sectional views.
Figure 3B:
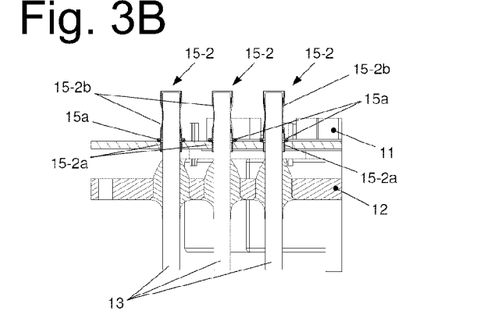
Figure 3C:
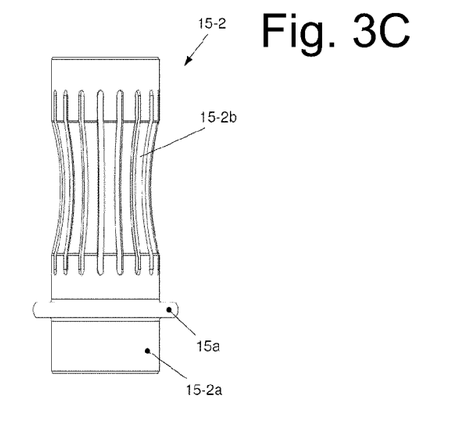
FIGS. 3C and 3D: The second contact device with a first contact area and a second contact area in lateral and perspective views.
Figure 3D:
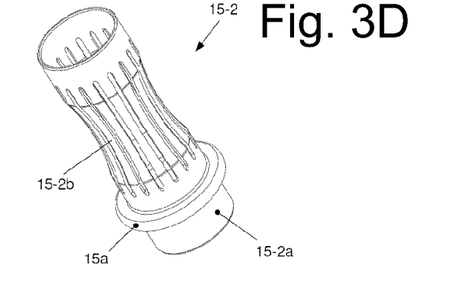

FIGS. 3A and 3B show the plug-in connectors 13 of a connection arrangement 9 each with a second contact device 15-2 in a state when the inverter is mounted on the PCB 12 in perspective view and cross-sectional views. FIGS. 3C and 3D show the second contact device 15-2 with the first contact area 15-2*a* and a second contact area 15-2*b* in lateral and perspective detail views.

The second contact device 15-2 that is also produced essentially as a hollow cylinder-shaped contact sleeve for safe electrical connection with compensation of the tolerances occurring between the plug-in connector 13 and the PCB 12 exhibits a first contact area 15-2*a* and a second contact area 15-2*b*, which extend along a common longitudinal axis. The contact device 15-2 is produced with the contact areas 15-2*a*, 15-2*b* as a one-piece component.

The first contact area 15-2*a* and the second contact area 15-2*b* are connected to one another via a section produced as a collar 15*a*, specifically as a seat or flange. The collar 15*a* is produced around the whole outer surface of the sleeve. Consequently, the first contact area 15-2*a* extends from a first end face of the sleeve up to the collar 15*a* and is produced with a smaller extent in the axial direction than the second contact area 15-2*b* that extends from a second end face of the sleeve up to the collar 15*a*. In addition, the sleeve exhibits an opening for mounting the plug-in connector 13, in particular a pass-through opening, and thus extends from the first end face to the second end face of the sleeve.

In the first contact area 15-2*a*, the hollow cylinder-shaped contact device 15-2 is produced with an essentially constant wall thickness. The collar 15*a* is aligned on a plane that extends vertically relative to the longitudinal axis of the hollow cylinder-shaped first contact area 15-2*a* and projects beyond the outer surfaces of the contact areas 15-2*a*, 15-2*b* in the radial direction in such a way that the contact device 15 2 is produced with a larger wall thickness in the area of the collar 15*a*.

The first contact area 15-2*a* is arranged directly in the PCB 12 and soldered to the PCB 12, wherein the contact sleeve, always leading with its first end face, is inserted through a pass-through opening produced in the PCB 12 and is with the flange-like or bulge-like collar 15*a* intended as an axial stop and support in contact with a surface of the PCB 12. The contact device 15-2 projects in particular with the second contact area 15-2b and the collar 15a on a surface of the PCB 12 beyond the PCB 12. The first contact area 15-2a is arranged at least with a major part within the pass-through opening of the PCB 12.

The diameter of the pass-through opening to be produced in the PCB 12 corresponds essentially to the outer diameter of the first contact area 15-2a plus a clearance for mounting and soldering the components. The surface of the first contact device 15-2, which is produced of a metal, is treated, in particular coated, especially tinned, e.g. for reflow soldering.

After preferably automatic insertion of the contact device 15-2 into the pass-through opening of the PCB 12, the contact device 15-2 is connected to the PCB 12 by way of soft-soldering. In addition, the collar 15a produced as an axial stop provides for a sufficient soldering slot during the soldering process so as to take up all loads during mounting and operation.

During fitting, the contact device 15-2 with the second contact area 15-2b produced as a spring contact element, in particular with elastically deformable lamellar contact springs, is plugged onto a plug-in connector 13. The wall of the second contact area 15-2b is produced in the form of a circular ring in the area of the end faces and bulging evenly inwards in a radial direction in the area of the lamellar contact springs. The lamellar contact springs produced as string shapes are connected to one another on the end faces, whereas, in addition, an end face of the second contact area 15-2b is connected to the collar 15a.

The lamellar contact springs are integral part of the contact device 15-2. The lamellar contact springs are produced from the original form of the cylindrical sleeve, wherein the wall of the sleeve is slotted in the axial direction or longitudinal direction several times in the second contact area 15-2b. The strips of constant and preferably the same width in the circumferential direction and the same length in the axial direction which are produced as described are bent towards the inner surface of the sleeve in such a way that the lamellar contact springs result. The lamellar contact springs are arranged circular.

The extension of the second contact area 15-2b in the axial direction preferably corresponds essentially to the maximum length of the area of the plug-in connector 13, which projects beyond the PCB 12.

The contact device 15-2 exhibits an internal diameter both in the whole first contact area 15-2a and on each end face of the second contact area 15-2b, which corresponds to the outer diameter of the plug-in connector 13 such that its inner surface is in contact with the outer surface of the plug-in connector 13 when the arrangement is fitted and thus establishes an electrical connection to the plug-in connector 13, or which is greater than the outer diameter of the plug-in connector 13.

The second contact area 15-2b, with the lamellar contact springs deflected from the radial direction of the contact device 15-2, exhibits a minimum internal diameter that is smaller than the outer diameter of the plug-in connectors 13. When inserting the plug-in connector 13 into the opening of the contact device 15-2, the individual lamellar contacts are brought into contact with the outer surfaces of the plug-in connector 13 in such a way that they are elastically deformed in such a way that an electrical connection is established between the plug-in connector 13 and the contact device 15-2.

When the arrangement is fitted, the PCB 12 is plugged onto the plug-connectors 13 arranged in the PCB 12 and firmly fixed to the PCB 12 in such a way that the plug-in connectors 13 are arranged inside the contact device 15-2. Each of the plug-in connectors 13 is fully enclosed by a contact device 15-2.

In the fitted state, the contact device 15-2 and the plug-in connector 13 are aligned and arranged in such a way that the occurring tolerances are compensated sufficiently so as to be able to mount the plug-in connectors 13 also under extreme tolerance conditions and to establish an electrical connection between the PCB 12 and the plug-in connector 13.

The invention relates to an arrangement for connecting electrical connections for a device used to drive a compressor. The invention also relates to a method for mounting the arrangement, and a device used to drive a compressor, in particular an electric motor to compress a vaporous fluid, in particular a refrigerant. The compressor can be used in a refrigerant circuit of a motor vehicle air-conditioning system.

The invention claimed is:

1. An arrangement for connecting electrical connections, in particular through a housing, for a device used to drive a compressor, exhibiting a connection arrangement with at least one electrically conductive connecting element, as well as at least one contact device fixed in a PCB, for mounting the connecting element in an axial direction, wherein the contact device exhibits at least one spring contact element with elastically deformable lamellar contact springs that are in electrically conductive contact with the connecting element, wherein the contact device exhibits a first contact element, as well as a second contact element that is produced separately to the first contact element, wherein the first contact element, produced as a hollow cylinder-shaped contact sleeve, is arranged in a radial direction on an outer surface of the second contact element in such a way that the second contact element is fully enclosed, wherein the second contact element is produced as a spring contact element with the elastically deformable lamellar contact springs and arranged such that it encloses the connecting element and establishes electrical contact, wherein the second contact element is produced with a locking mechanism that faces radially inwards on an end face that faces outwards in the axial direction, wherein the second contact element attached to the connecting element is arranged inside the first contact element connected to the PCB, and wherein the locking mechanism serves as a stopper when the second contact element is attached to the connecting element before the second contact element is arranged inside the first contact element.

2. The arrangement according to claim 1, wherein the first contact element, produced as the hollow cylinder-shaped contact sleeve, exhibits a first section and a second section, each of which extend in the axial direction and are connected to one another at a collar.

3. The arrangement according to claim 2, wherein the first section extends from a first end face up to the collar and the second section extends from a second end face up to the collar.

4. The arrangement according to claim 2, wherein the collar is produced such that it projects beyond outer surfaces of the first section and the second section in the radial direction and fully encloses the first contact element.

5. The arrangement according to claim 2, wherein the collar is aligned on a plane that extends vertically relative to a longitudinal axis of the first contact element that is arranged in the axial direction.

6. The arrangement according to claim 1, wherein the lamellar contact springs of the spring element are produced as string shapes in the axial direction of the contact device.

7. The arrangement according to claim 6, wherein the lamellar contact springs are connected to one another at ends arranged opposite one another, wherein the connections are each produced in the form of a circular ring.

8. The arrangement according to claim 7, wherein in an initial state of the second contact element the lamellar contact springs are produced with inward or outward bulging in the radial direction in the area between the ends.

9. The arrangement according to claim 1, wherein the connecting element is produced as a pin-like plug-in connector with a cylinder shape.

10. The arrangement according to claim 9, wherein the connecting element is produced with a circular cylinder shape.

11. The arrangement according to claim 1, wherein the contact device and the connecting element are arranged and aligned coaxially to one another.

12. The arrangement according to claim 1, wherein the first contact element, produced as the hollow cylinder-shaped contact sleeve, exhibits an opening, extending from a first end face to a second end face, for mounting the second contact element.

13. The arrangement according to claim 1, wherein the lamellar contact springs are connected to one another at ends arranged opposite one another and that the connections each exhibit a form of a circular ring, wherein each of the circular rings is produced with a slot-shaped opening.

14. The arrangement according to claim 1, wherein in an initial state of the second contact element the lamellar contact springs are produced such that they exhibit outward bulging in the radial direction, wherein the second contact element exhibits a maximum outer diameter in a section produced with the lamellar contact springs, which is greater than an internal diameter of the first contact element produced as the hollow cylinder-shaped contact sleeve, and that when the arrangement is fitted the lamellar contact springs are each elastically deformed and in contact via outer surfaces with an inner surface of the first contact element.

15. The arrangement according to claim 1, wherein the first section of the first contact element, produced as the hollow cylinder-shaped contact sleeve, is inserted into a pass-through opening that is produced in the PCB and is then soldered to the PCB.

16. A device for driving the compressor of a vapourous fluid, in particular an electric motor, exhibiting a rotor and a stator, which are arranged along a common longitudinal axis, as well as the housing, wherein a support element with a mounting element for mounting the at least one connecting element and an arrangement for connecting the electrical connections according to claim 1 are produced on a first end face of the stator, aligned in the axial direction.

17. Use of the device for driving the compressor, in particular an electric motor, for compressing a vapourous fluid, according to claim 16 for the compressor of a refrigerant in a refrigerant circuit of a motor vehicle air conditioning system.

18. A method for mounting the arrangement for connecting electrical connections for the device used to drive the compressor, the arrangement exhibiting a connection arrangement with at least one electrically conductive connecting element, as well as at least one contact device fixed in a PCB, for mounting the connecting element in an axial direction, wherein the contact device exhibits at least one spring contact element with elastically deformable lamellar contact springs that are in electrically conductive contact with the connecting element, exhibiting the following steps:
  connection of the at least one contact device to the PCB, wherein the at least one contact device is inserted, always leading with its first end face, through a pass-through opening produced in the PCB until the at least one contact device is in contact with a collar on the PCB, as well as
  soldering of the at least one contact device to the PCB, attachment of the at least one spring contact element with the elastically deformable lamellar contact springs of the at least one contact device to the connecting element so that the at least one contact device with the spring contact element is in electrically conductive contact with the connecting element and an electrical connection is established between the PCB and the connecting element.

19. The method according to claim 18, wherein at least one first contact element of the contact device is connected to the PCB and at least one second contact element is attached to the connecting element and that the PCB with the at least one first contact element, itself firmly connected to the PCB, is pressed onto the connecting element with at least one second contact element, itself attached on the connecting element, in such a way that the at least one second contact element is arranged inside the at least one first contact element.

20. The method according to claim 19, wherein when inserting the at least one second contact element into an opening of the at least one first contact element individual lamellar contact springs of the spring contact element are brought into contact with an inner surface of the at least one first contact element and elastically deformed in such a way that an electrical connection is established between the at least one first contact element and the at least one second contact element of the contact device.

21. The method according to claim 18, wherein the at least one contact device is connected to the PCB in a first contact area and that the PCB with the contact device, itself firmly connected to the PCB, is pressed onto the connecting element in a second contact area in such a way that the connecting element is arranged at least inside the second contact area.

22. The method according to claim 21, wherein when pressing the contact device with the second contact area onto the connecting element individual lamellar contact springs of the spring contact element are brought into contact with an outer surface of the connecting element and elastically deformed in such a way that an electrical connection is established between the contact device and the connecting element.

* * * * *